United States Patent [19]
Bar

[11] Patent Number: 4,869,062
[45] Date of Patent: Sep. 26, 1989

[54] BURNER FOR SOLID AND OTHER HIGH ASH FUELS

[75] Inventor: Dali Bar, North York, Canada

[73] Assignee: Canadian Solifuels Inc., Scarborough, Canada

[21] Appl. No.: 286,892

[22] Filed: Dec. 20, 1988

Related U.S. Application Data

[63] Continuation of Ser. No. 152,548, Feb. 5, 1988, abandoned.

[30] Foreign Application Priority Data

Feb. 6, 1987 [GB] United Kingdom ............... 8702645

[51] Int. Cl.⁴ ............................................. F02C 3/26
[52] U.S. Cl. .................................. 60/39.464; 60/750; 110/264
[58] Field of Search ............. 60/39.36, 39.37, 39.464, 60/732, 733, 750; 110/264; 431/173

[56] References Cited

U.S. PATENT DOCUMENTS

| | | | |
|---|---|---|---|
| 2,707,444 | 5/1955 | Van Loon | 60/39.464 |
| 2,808,012 | 10/1957 | Schindler | 110/264 |
| 3,658,482 | 4/1972 | Evans et al. | 431/173 |
| 4,144,019 | 3/1979 | Lyshkow et al. | 431/173 |
| 4,338,782 | 7/1982 | Marchand | 60/39.464 |
| 4,702,073 | 10/1987 | Melconian | 60/39.464 |

Primary Examiner—Louis J. Casaregola
Attorney, Agent, or Firm—Ivor M. Hughes

[57] ABSTRACT

A novel combustion device is installed into a gas turbine to permit operation with solid or other high ash fuels. A refractory burner block defines an annular primary combustion chamber and a number of secondary cyclonic combustion chambers positioned radially inwardly of the primary chamber. Waste wood or other solid fuels are charged into the primary combustion chamber. Pressurized combustion air flows derived from the turbine's compressor are introduced tangentially into the primary chamber thereby creating a vortex. A number of passages place the primary chamber in communication with the secondary chambers. These passages are formed in a radially inner wall of the primary chamber so that fuel particles are retained within the primary chamber by centrifugal forces until reduced to an appropriate size for combustion in the secondary chambers. The primary chamber exhaust flows and additional combustion air are introduced tangentially into each secondary chamber adjacent to a short exhaust tube leading to the turbine's runner thereby creating a vortex in each secondary chamber. Ash produced in each secondary chamber travels under the influence of the vortex along an inner chamber wall in a direction opposite to combustion gas flows through the exhaust tube and escapes radially through an opening distant from the exhaust tube.

29 Claims, 3 Drawing Sheets

BURNER FOR SOLID AND OTHER HIGH ASH FUELS

This case is a continuation of application Ser. No. 152, 548 filed 2/5/88, now abandoned.

FIELD OF THE INVENTION

The invention relates generally to the combustion of solid fuels and other fuels tending to produce large quantities of ash during combustion. The invention is singularly useful in the context of gas turbines, permitting such devices to be operated directly with solid or other high ash fuels.

DESCRIPTION OF THE PRIOR ART

Gas turbines represent one of the more efficient means for converting hydrocarbon fuels into electric energy. However, the cost of conventional fuels such as gas or oil has prompted efforts to operate gas turbines from less expensive solid fuels such as biomass products, often waste products of other processes. A major problem in adapting conventional gas turbines for operation with such fuels is the entrainment of fuel particulates and ash by-products with the high velocity gas flows characteristic of such machines. In order to avoid damage to the vanes of the runner commonly associated with such a turbine, it would be necessary to ensure that particulates remaining in the combustion gases be reduced to a particle size of less than about 5 micrometers.

One solution to this problem involves use of heat exchangers which essentially isolate the combustion processes from the overall operation of the turbine. Such an arrangement entirely avoids introduction of combustion particulates into the gas flows associated with the turbine; however, this also results in a rather bulky system and a loss of efficiency in the heat exchange process. Additionally, the combustion process would most commonly be operated at atmospheric pressure, necessitating large volumes of combustion air and consequently large heat exchangers, if substantial heat release rates are to be achieved.

An alternative to use of heat exchangers involves combustion and gasification of solid fuels external to the gas turbine prior to introduction into the turbine. Pressurized combustion air might be generated by the compressor stage of the turbine and consequently high combustion rates can be achieved using comparatively small external combustion chambers. Solid fuels such as biomass or coal may be charged to the combustion chamber using solid pumps appropriate for avoiding any substantial pressure losses. Since combustion is external to the turbine, ash produced by combustion of such materials can be conveniently removed externally of the turbine prior to delivery of combustion gases. Because of the number of components which are external to the turbine itself, such an arrangement is once again very bulky. Additionally, high-efficiency external lash separators introduce a large pressure drop thereby reducing the amount of energy which is ultimately recovered by the turbine.

BRIEF SUMMARY OF THE INVENTION

In one aspect, the invention provides combustion apparatus for producing combustion gas flows from a fuel and for separating ash from the combustion gases. The apparatus includes the first combustion chamber having an annular combustion zone and a second combustion chamber positioned radially inwardly of the annular combustion zone. The first combustion chamber is associated with a fuel inlet port for receiving the fuel and an air inlet port, the air inlet port being structured to introduced compressed air flows into the annular combustion zone in such a direction as to produce a vortex in the annular combustion zone which circulates fuel particulates about a central axis of the primary chamber. The second combustion chamber is associated with an air inlet port, an exhaust port aligned with a central axis of the chamber and positioned adjacent one axial end of the chamber for discharge of combustion gas flows, and an ash removal port positioned towards one opposing end of the second combustion chamber for removal of ash in one embodiment an axially opposing end of the second combustion chamber for removal of ash. A passage or combustion gas flow path is formed which has an inlet accessing the annular combustion gas flow path is formed which has an inlet accessing the annular combustion zone and an outlet accessing the interior of the second combustion chamber. The inlet end of the passage is located radially inwardly of the annular combustion zone so that the vortex associated with the first combustion chamber tends to retain larger fuel particulates until reduced sufficiently by combustion to be entrained with combustion gas flows through the passage into the second combustion chamber. The passage is structured to introduce combustion gas lows into the second combustion chamber in such a direction as to produce a vortex in the second combustion chamber which circulates fuel particulates around the second central axis and which entrains ash to the ash removal port. The air inlet port associated with the second combustion chamber is preferably structured to introduce compressed combustion air flows into the chamber in a direction which enhances the vortex in the second combustion chamber. The combustion apparatus lends itself to production of a very compact burner unit which can produce exhaust gas flows relatively free of large particulates such as unconsumed fuel particulates or ash.

In another aspect, the invention provides a gas turbine design which lends itself to operation with solid or high ash producing fuels. A combustion section is located intermediate a compressor section and runner associated with the turbine. The combustion sections includes an annular combustion chamber having a fuel inlet for receipt of particulates solid fuels and a combustion air inlet. The combustion air inlet is adapted to introduce pressurized combustion air flows derived from the compressor so as to create a vortex in the interior of the annular combustion chamber. An exhaust outlet is formed radically inwardly of the annular combustion chamber, and consequently fuel particles tend to circulate in the annular combustion chamber until consumed sufficiently to be drawn by pressure differences through the exhaust outlet. The annular combustion chamber preferably serves as a manifold for a multiplicity of secondary cyclonic combustion chambers. The exhaust flows of the primary combustion chamber may enter each cyclonic burner chamber substantially tangentially to a chamber side wall thereby creating a vortex in the interior of the chamber. The point of entry is preferably adjacent to an exhaust outlet formed as a central internal tube of preselected length that ensures that fuel particulates are not immediately expelled upon entry. In each secondary combustion chamber, ash produced by the combustion process travels under the influence of the contained vortex along the chambers side wall towards a chamber end was opposite the associated exhaust tube. An ash outlet is preferably formed in the chamber side wall in such a manner as to permit radial discharge of the ash into an ash manifold. The escaping ash may then be conveyed along a conduit leading to points external to the turbine where the ash may be conveniently disposed. Additional pressurized air may be introduced substantially tangentially into each secondary combustion chamber to enhance the vortex which effects removal of ash in the chamber and to improve particle combustion thereby providing a cleaner combustion gas flows to the turbine runner. Use of a multiplicity of secondary cyclonic burners is preferred, as these may be conveniently aligned axially with the turbine shaft and spaced apart to permit formation of a central clearance passage accommodating the presence of the shaft. However, an embodiment of the invention may be implemented using a single secondary cyclonic burner as discussed more fully below.

Other aspects of the present invention will be apparent from a description below of a preferred embodiment and will be more specifically identified in the appended claims.

DESCRIPTION OF THE DRAWINGS

The invention will be better understood with reference to drawings in which.

DESCRIPTION OF A PREFERRED EMBODIMENT

Figure 1:
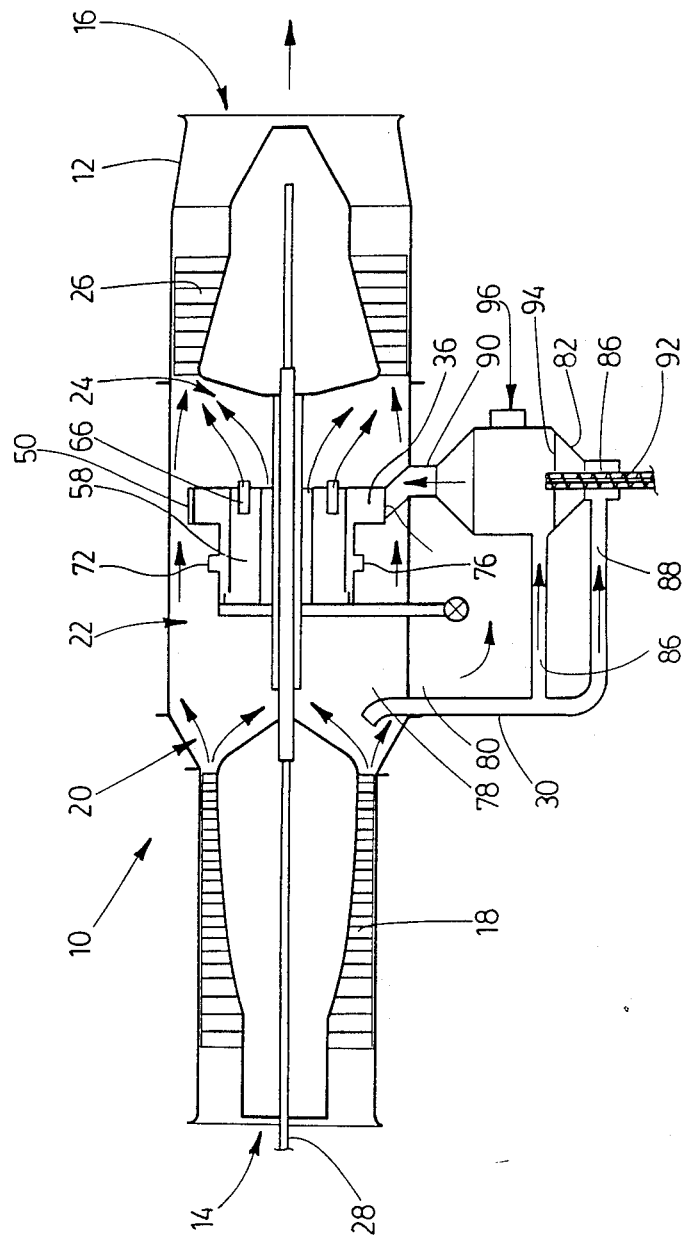
FIG. 1 is a diagrammatic representation of a gas turbine according to the invention together with an optional external pyrolizer.
Figure 2:
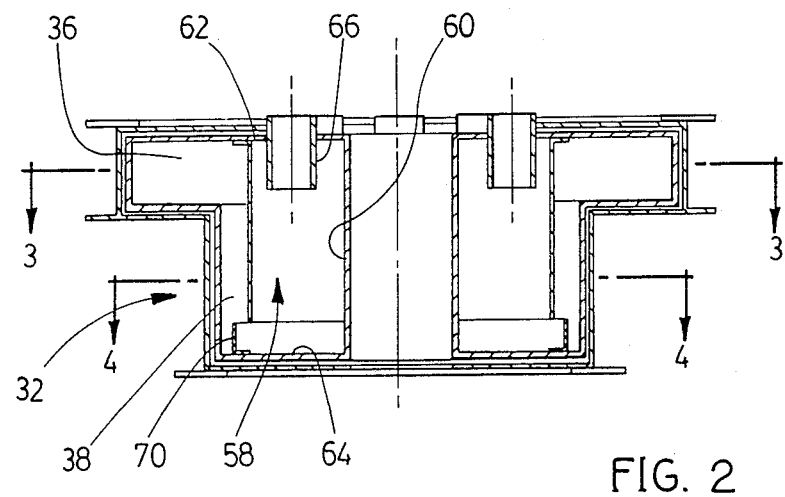
FIG. 2 is a cross-sectional view in a plane containing the longitudinal axis of a central turbine shaft showing details of a burner block.

Reference is made to FIG. 1 which illustrates the overall configuration of a gas turbine 10 operable from solid fuels such as biomass, coal or similar hydrocarbon fuels. The turbine 10 has an elongate housing 12 with air inlet 14 and an opposing exhaust outlet 16. A vaned compressor 18 is located inside the housing 12 adjacent to the air inlet 14 and serves to produce pressurized air flows in the interior of the housing 12, when rotated. The turbine housing defines or contains a diffuser section 20, a combustion section 22, a mixer section 24 and a vaned runner 26 (itself commonly referred to as a "turbine") appropriately configured for rotation under the influence of expanding exhaust gases. A longitudinal shaft 28 connects the compressor 18 and runner 26 so that the two units rotate together. The representation of the turbine 10 is largely schematic in order to highlight inventive features incorporated into the turbine. Details regarding the assembly of such a device will be apparent to those skilled in the art.

The air flows generated by the compressor 18 may be regarded as divided into three streams. These include a peripheral air stream which serves to cool the housing walls adjacent to the combustion section 22 and to provide combustion air for primary and secondary combustion chambers associated with the combustion section 22. An axial air stream follows the central longitudinal axis of the turbine 10 and serving primarily to cool the turbine shaft 28 which passes through the centre of the combustion section 22. Additionally, these two air streams are mixed with the exhaust gases escaping from the combustion section 22 to reduce the temperature of gas flows in the mixer section 24 prior to entry into the runner 26. An auxiliary air stream is tapped from the diffuser section 20 by an air supply conduit 30 leading to the exterior of the turbine 10 for use primarily in connection with the combustion of certain solid fuels (damp fuels).

The combustion section 22 (FIGS. 2-5) includes a refractory burner block 32 formed with a central passage 34 that permits location of the burner block 32 about the turbine shaft 28 with clearance for passage of the axial air stream. The burner block 32 includes a primary combustion chamber 36 of generally annular shape and a central core 38 which defines eight cyclonic combustion chambers. Initial combustion of pelletized or particulate solid fuels takes place in the annular combustion zone defined by the primary combustion chamber 36, the primary combustion chambers serving as a manifold that delivers combustion gases and entrained particulates to the eight secondary combustion chamber for further reaction, prior to discharging of combustion gases to the mixer section 24 and the turbine runner 26.

The primary combustion chamber 36 has a fuel inlet port 46 (apparent in FIG. 3) where solid fuels are delivered from points external to the turbine 10 by a screw driver or other charging mechanism appropriately adapted to prevent significant pressure losses from the chamber 36. The primary combustion chamber 35 also has a combustion air inlet 50 which diverts pressurized air from the peripheral air stream produced by the compressor 18 into the interior of the chamber 36. The air inlet 50 is angled to inject air flows substantially tangentially and proximate to a generally circular, radially outer chamber wall 52 thereby tending to produce a vortex which circulates fuel particulates in a circumferential direction (counter-clockwise as indicated with curved arrows in FIG. 3) around the central axis of the chamber (substantially coincident with the shaft's longitudinal axis). Eight exhaust passages (longitudinally-directed, angled slots) are formed in a radially inner chamber wall 54. These define eight discrete gas flow paths between the primary combustion chamber 36 and the multiplicity of secondary combustion chambers, each being associated with an inlet opening accessing the annular combustion zone of the primary combustion chamber 36 at the radially inner wall 54 and an outlet opening accessing the interior of a different one of the secondary combustion chambers. It will be apparent that fuel particulates in the combustion chamber 36 will be affected by centrifugal forces due to the vortex which will tend to cast the particulates towards the radially outer chamber wall 52 and the general flow of gases under the pressure difference between the air inlet 50 and the exhaust passages which will tend to discharge particles. Accordingly, the fuel particulates will tend to remain with the primary combustion chamber 36 at least until reduced to a particle size appropriate for entrainment with gas flows through the passages. This arrangement increases the residence time of the fuel particulates in the primary chamber 36 and provides for a turbulent combustion, which enhance heat liberation and particle size reduction.

A pilot port 56 is formed in the chamber 36 which communicates with an oil burner (not illustrated) that serves to initiate combustion in the primary chamber 38 during start-up of the turbine 10. The pilot port 56 is angled such that the burner exhaust flows enters the primary chamber 36 tangentially to the radially outer chamber wall to produce a vortex in the same circumferential direction as otherwise produced by the pressurized combustion air flows.

Figure 3:
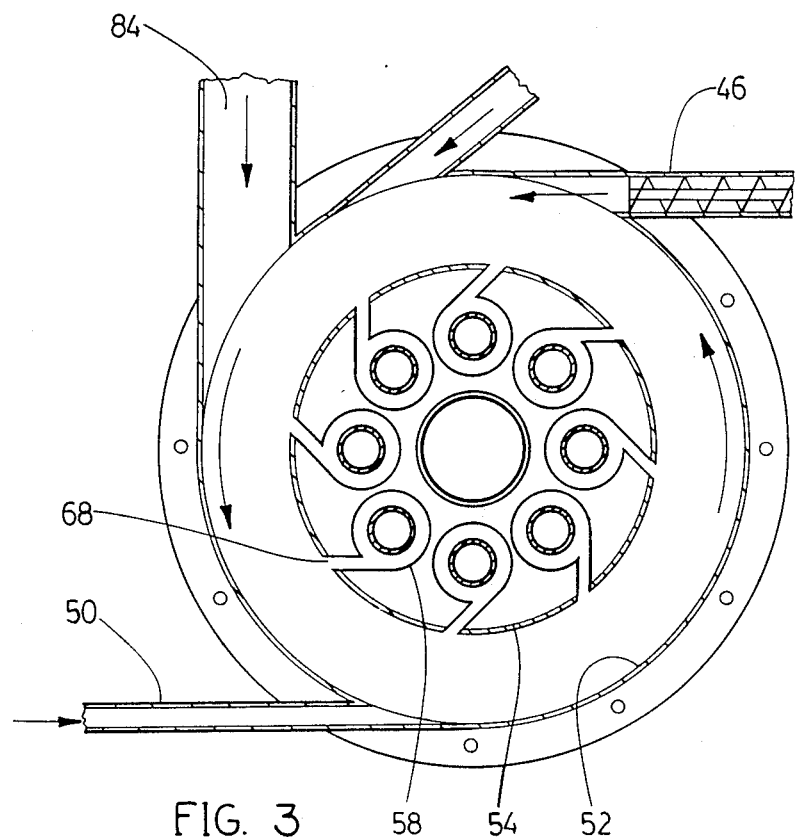
FIG. 3 is a sectional view along the lines 3—3 of FIG. 2 providing detail regarding an annular primary combustion chamber.
Figure 4:
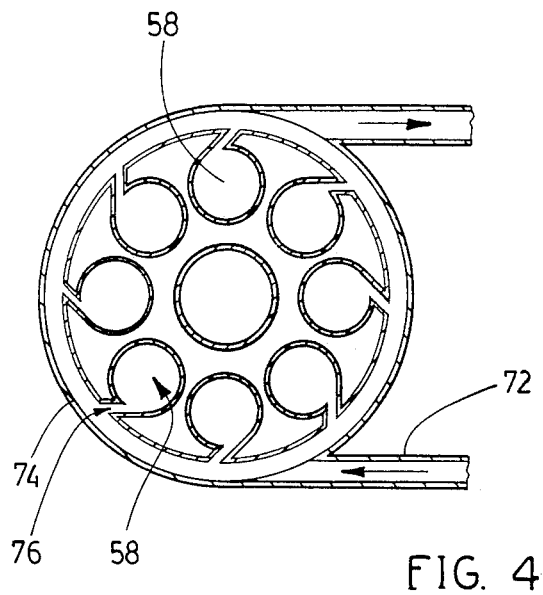
FIG. 4 is a sectional view along the lines 4—4 of FIG. 2 detailing a cooling jacket and associated air inlet and outlet used to supply secondary combustion air to a multiplicity of secondary cyclonic combustion chamber associated with the burner block; and, FIG. 5 is a cross-sectional view further detailing the external pyrolizer.
Figure 5:
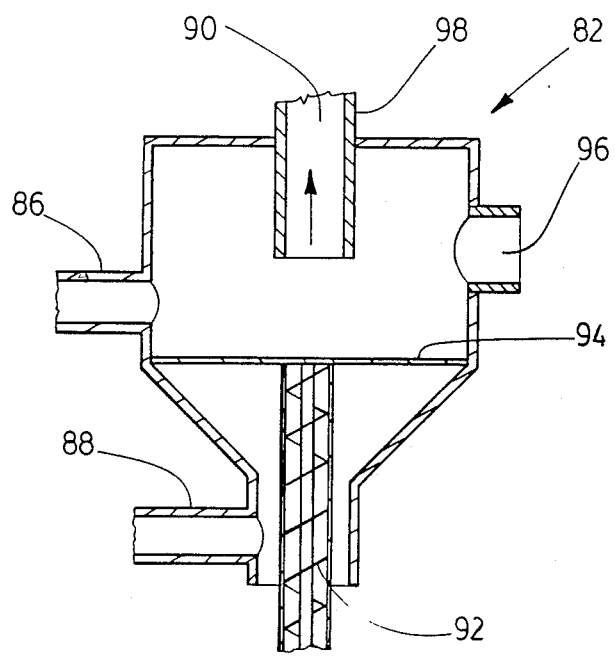

The eight secondary combustion chambers are equally spaced circumferentially about the longitudinal axis of the turbine 10, radially intermediate of the annular combustion chamber 36, as apparent in FIG. 3 and 4. The secondary combustion chamber 58 which is typical will be described in detail with reference to FIGS. 2–4. The chamber 58 has a generally cylindrical side wall 60 centered about a central axis of the chamber and a pair of axially opposing end walls 62, 64. A central stub-like exhaust tube 66 extends a preselected distance into the interior of the chamber from the end wall 62 and defines an exhaust outlet in-line or intersected by the central axis of the chamber 58, which communicates with the mixer section 24 and confronts the turbine runner 26. A passage or slot 68 (illustrated in FIG. 3 and described in general terms above) is formed in the chambers side wall 60 and is angled to provide for tangential introduction of the exhaust flows from the primary combustion chamber 36 relative to the chambers side wall 60 at a region proximate to the chamber end wall 62 and the base of the exhaust tube 66. The tangential introduction of these gas flows creates a vortex in the secondary combustion chamber 58 centered about the central axis of the chamber and the exhaust tube 66 and essentially in the counter-clockwise direction as viewed in the plane of FIG. 3).

Two effects of the vortex in the secondary combustion chamber 58 should be noted. First, the centrifugal forces applied to partially combusted fuel particles tends to prevent such particles from escaping immediately from the chamber with general gas flows. Second, the vortex tends to entrain lighter ash by-products of combustion in a spiraling manner along the chambers side wall 60 towards the chamber end wall 64 opposite the exhaust tube 66. By providing a port 70 which opens into the chambers side wall 60, the ash tends to escape radially from the chamber. Appropriate dimensioning of the secondary combustion chamber (selection of a relatively small diameter) provides improved particle combustion and ash removal thereby allowing cleaner exhaust gas flows to the runner 26. The provision of the stub-like exhaust tube 66 causes some increase in the pressure drop experienced by gas flows through the burner, but enhances the combustion of gas particulates and ash removal.

Pressurized secondary combustion air derived from the peripheral air flows referred to above is provided to each of the eight secondary combustion chambers. These secondary combustion air flows are received through an inlet conduit 72 (FIG. 4) into the interior of a jacket 74 formed about the burner core 38. The jacket 74 defines a manifold which supplies secondary combustion air to each of the cyclonic burners. With respect to the secondary cyclonic burner 58, which is typical, the pressurized air is introduced through an angled port or slot 76 (indicated in FIG. 4) formed in the chambers side wall 60 between or intermediate of the ash port 70 and the combustion gas passage 68. The air inlet port 76 is similar in structure to the combustion gas passage 68 formed in the chambers side wall 60 adjacent to the opposing chamber end wall 62 and is in essence aligned with, but axially separated from, the combustion gas passage 68. The air inlet port 76 is angled to introduce the secondary combustion air flows substantially tangentially relative to the internal surface defined by the cylindrical side wall 60 thereby augmenting the vortex formed by the exhaust flows from the primary chamber 36. Accordingly, this arrangement not only provides combustion air, but has the additional effect of markedly improving ash removal despite some disturbance of ash movement along the cylinder side wall.

The ash removal port 70 itself accesses an annular manifold 78 which empties into an air-tight conduit 80 leading to points external to the turbine 10 and terminated with a valve 81 (all as illustrated if FIG. 1) that restricts the introduction of air into the conduit 80 and regulates discharge of ash. This arrangement ensures proper removal of substantially all ash generated from combustion. Experiments performed in connection with the present invention have shown that radial removal of the ash during travels along the side wall of such a combustion chamber markedly enhances the efficiency of ash removal. Axial removal at the end wall of such a chamber, particularly through a central opening aligned with the axis of the chamber and the vortex, may, due to boundary layer effects, cause ash to be caught by the vortex prior to removal from the combustion chamber and expelled into the gas stream to the runner. Radial removal of ash has been shown in laboratory experiments conducted in connection with the development of this invention to produce levels of particulates in the exhaust flows acceptable to a conventional gas turbine runner. Radial ash removal also has the added advantage of avoiding the need to extend discharge conduits axially from the burner block 32 proximate to the turbine shaft 28.

An optional fluid bed pyrolizer 82 (illustrated in FIGS. 1 and 5) may be used in connection with the gas turbine 10. The pressurized exhaust flows generated by the pyrolizer 82 may be directed to a special inlet port 84 formed in the primary combustion chamber 36 (as in FIG. 3), being introduced tangentially so as not to interfere with, but rather to enhance, the counter-clockwise vortex otherwise produced in the primary combustion chamber 36. Such a pyrolizer 82 and special primary chamber inlet port 84 may be provided where solid fuels to e charged to the primary combustion chamber 36 have a large thermal inertia, owing for example to high moisture content. Simultaneous introduction of solid fuels and hot air flows derived from the pyrolizer 82 will in such circumstances enhance the combustion which would otherwise occur in the primary chamber, permitting greater throughput of moisture-bearing solid fuels without undue exhausting of unconsumed fuel particulates.

The pyrolizer 82 has a housing formed with overfire and underfire combustion air inlets 86, 88 and an exhaust outlet 90 (communicating with the inlet port 84 formed in the primary combination chamber 36). Solid fuels are fed into the interior of the pyrolizer housing by means of a screw drive 92 appropriate for retention of pressure heads within the housing, and deposited on a metal grate 94. The air supply conduit 30 serves as a common feed line placing the overfire and underfire air inlets 86, 88 in communication with the diffuser region 20 of the turbine 10 for receipt of pressurized combustion air. The pressurized underfire air stream tends to fluidize the bed of fuel accumulated above the grate 94 ensuring turbine combustion and comparatively high heat release rates for a chamber of given size. An ignition port 96 formed in the sidewall of the pyrolizer 82 permits an oil ignition burner to initiate combustion in the pyrolizer 82, and the combustion process is thereafter self-sustaining with continuous introduction of solid fuels and combustion air. The exhaust flows form the pyrolizer 82 consist primarily of heated air and exhaust gases appropriate for heating of fuel pellets introduced into the primary combustion chamber 36 that have a high moisture content.

The overfire air inlet port 86 is formed for tangential introduction of combustion air into the pyrolizer housing thereby producing a vortex in the interior of the pyrolizer 82 that tends to circulate fuel particulates until reduced in size by combustion. An exhaust tube 98 ensures that particulates are not immediately entrained with general gas flows despite the vortex (similar to the arrangement in the secondary combustion chamber). As a result, the exhaust flows from the pyrolizer 82 to the special inlet port 84 of the primary combustion chamber 36 tend to entrain uncombusted fuel particulates of a comparatively predictable size.

Several advantages of the gas turbine 10 should be noted. First, the general configuration of an annular primary combustion chamber with radially inset secondary combustion chambers lends itself to production of a very compact burner block or section. This arrangement is particularly advantageous in the context of a gas turbine, permitting the burner block to be conveniently mounted entirely within the gas turbine without radical modification of overall turbine design. Also, the primary and secondary combustion chamber are characterized by high internal recirculation of fuel particulates and turbulent combustion. This ensures proper combustion of particulates and high heat release rates for chambers of predetermined size. The tangential ash removal together with the provision of the central burner block formed with a multiplicity of secondary burner chambers permit very convenient unobstructed introduction of the turbine shaft and its cooling ducts. These factors together contribute to the provision of a relatively compact gas turbine appropriate for direct internal combustion of solid fuels.

Although the combustion section 22 has been shown as comprising a multiplicity of cyclonic burners fed by a manifold 36 (primary combustion chamber), the turbine can be implemented with a single larger cyclonic burner having the same general configuration of those illustrated, but having a central cylindrical wall extending fully through its interior to permit centering about the turbine shaft 28. The exhaust tube used to retain fuel particulates against immediate discharge upon injection into the secondary chamber may in such circumstances be formed about the central cylindrical wall and spaced to define an annular passage communicating between the interior of the chamber and the mixer section 24. The provision of a multiplicity of small secondary combustion chambers spaced about the central axis of the turbine is strongly preferred, as the reduction in the diameter of the chambers enhances ash removal efficiency.

Although the burners described are singularly advantageous in the context of a gas turbine where the prior art has failed to provide a suitable means for direct combustion of solid or high ash producing fuels in the interior of the turbine, it should be noted that such burners also lends themselves to other applications. For example, the burners may be used to operate boilers or other heating equipment from solid fuels when more conventional fuels such as oil or gas are not available. Since the exhaust gas flows of such burners are relatively clean, burner and exhaust system cleaning is not required with the frequency associated with conventional biomass combustors.

It will be appreciated that a particular embodiment of a combustion device has been described in the context of a gas turbine for purposes of illustrating the principles of operation associated with the invention and that modifications may be made therein without departing from the spirit of the invention and without necessarily departing from the scope of the appended claims.

I claim:

1. Combustion apparatus for producing combustion gas flows from a fuel and separating ash from the combustion gases, comprising:
   a first combustion chamber having a first central axis and an annular combustion zone located about the first central axis;
   a second combustion chamber positioned radially inwardly of the annular combustion zone and having a second central axis;
   the first combustion chamber being associated with a fuel inlet port for receiving the fuel and an air inlet port, the air inlet port being structured to introduce compressed air flows into the annular combustion zone in a direction such that a vortex is produced in the annular combustion zone which circulates fuel particulates around the first central axis;
   the second combustion chamber being associated with an air inlet port, an exhaust port aligned with the second central axis and positioned towards one axial end of the second combustion chamber for discharge of combustion gas flows, and an ash removal port positioned towards an axially opposing end of the second combustion chamber for removal of ash; and,
   means defining a passage having an inlet accessing the annular combustion zone and an outlet accessing the interior of the second combustion chamber, the passage being structured to introduce combustion gas flows from the first combustion chamber into the second combustion chamber in a direction such that a vortex is produced in the secondary combustion chamber which circulates fuel particulates around the second central axis and which entrains ash to the associated ash removal port, the passage inlet end being positioned radially inwardly of the annular combustion zone such that the vortex associated with the first combustion chamber tends to retain larger fuel particulates until reduced sufficiently by combustion to be entrained with combustion gas flows through the passage into the second combustion chamber.

2. Combustion apparatus is claimed in claim 1 in which the air inlet port associated with the second combustion chamber is structured to introduce compressed air flows into the second combustion chamber in a direction which enhances the vortex in the second combustion chamber.

3. Combustion apparatus as claimed in claim 1 in which the second combustion chamber comprises a cylindrical inner wall substantially centered about the second central axis, the ash outlet port opening into the cylindrical inner wall such that ash escapes radially outwardly from the second combustion chamber into the ash outlet port.

4. Combustion apparatus as claimed in claim 3 comprises an exhaust tube defining the exhaust outlet port associated with the second combustion chamber, and extending a preselected distance into the interior of the second combustion chamber, the passage outlet being positioned to introduce combustion gas flows from the first combustion chamber proximate to the combustion chamber end wall and the exhaust tube.

5. Combustion apparatus as claimed in claim 1 comprising solid fuel delivery means for delivering solid fuel to the interior of the first combustion chamber.

6. Combustion apparatus as claimed in claim 1 in which the first combustion chamber is associated with a pilot burner port for introducing a pilot burner combustion flow into the interior of the first combustion chamber.

7. Combustion apparatus as claimed in claim 1 in which the first and second axes are generally parallel.

8. Combustion apparatus for producing combustion gas flows from a fuel and separating ash from the combustion gases, comprising:
a first combustion chamber having a central axis and having an annular combustion zone located about the central axis;
a multiplicity of secondary combustion chambers, the secondary combustion chamber being positioned radially inwardly of the annular combustion zone and being circumferentially spaced apart relative to one another, each of the secondary combustion chambers having a central axis generally parallel to the central axis of the first combustion chamber;
the first combustion chamber being associated with a fuel inlet port for receiving the fuel and an air inlet port, the air inlet port being structured to introduce compressed air flows into the annular combustion zone in a direction such that a vortex is produced in the annular combustion zone which circulates fuel particulates around the first central axis;
each of the secondary combustion chamber being associated with an air inlet port, an exhaust port aligned with the central axis of the combustion chamber and positioned towards one axial end of the secondary combustion chamber for discharge of combustion gas flows, and an ash removal port positioned towards an axially opposing end of the secondary combustion chamber for removal of ash, the exhaust ports of the multiplicity of secondary combustion chambers exhausting combustion gas flows in a common direction; and,
means defining a multiplicity of flow paths, each flow path being associated with an inlet accessing the annular combustion zone and with an outlet accessing the interior of an associated one of the secondary combustion chamber, each flow path being shaped to introduce combustion gas flows from the primary chamber into the associated secondary combustion chamber in a direction in a direction such that a vortex is produced in the secondary combustion chamber which circulates fuel particulates around the associated central axis and which entrains ash to the associated ash removal port, the inlet associated with each flow path being positioned radially inwardly of the annular combustion zone whereby the vortex associated with the first combustion chamber tends to retain larger fuel particulates until reduced sufficiently by combustion to be entrained with combustion gas flows along the flow paths into the secondary combustion chambers.

9. Combustion apparatus as claimed in claim 8 in which the air inlet port associated with each secondary combustion chamber is structured to introduce compressed air flows into the secondary combustion chamber in a direction which enhances the vortex in the associated secondary combustion chamber.

10. Combustion apparatus as claimed in claim 8 in which each of the secondary combustion chambers comprises a cylindrical inner wall substantially centered about the associated central axis, the ash outlet port associated with each of the secondary combustion chambers opens into the associated cylindrical inner wall such that ash escapes radially outwardly from each of the secondary combustion chambers into the associated ash outlet port.

11. Combustion apparatus as claimed in a claim 10 comprising:
an ash removal manifold communicating with each of the ash outlet ports associated with the secondary combustion chambers; and,
means defining a conduit extending from the ash removal manifold for conveying ash away from the manifold and having a conduit outlet where ash can be removed; and,
valve means associated with conduit for restricting introduction of air through the conduit outlet into the interior of the conduit and for regulating removal of ash from the conduit outlet.

12. Combustion apparatus as claimed in claim 8 in which each of the secondary combustion chambers comprises an exhaust tube defining the exhaust outlet associated with the secondary combustion chamber, the exhaust tube being attached to an end wall of the associated secondary combustion chamber and extending a preselected distance into the interior of the secondary combustion chamber, the passage outlet associated with each of the secondary combustion chamber being positioned to introduce combustion gas flows from the first combustion chamber proximate to the combustion chamber end wall and the exhaust tube of the associated secondary combustion chamber.

13. Combustion apparatus as claimed in claim 8 comprising solid fuel delivery means for delivering solid fuel to the interior of the first combustion chamber.

14. Combustion apparatus as claimed in claim 8 in which the first combustion chamber is associated with a pilot burner port for introducing a pilot burner combustion flow into the interior of the first combustion chamber.

15. A gas turbine adapted for operation from solid or high ash producing fuels, comprising:
a housing having an inlet and an outlet for passage of gases;
a compressor section rotatably mounted in the interior of the housing adjacent the housing inlet;
a runner rotatably mounted in the interior of the housing adjacent a housing outlet;
a shaft joining the compressor section and the runner for rotation together and having a longitudinal axis;
a burner mounted about the shaft in the interior of the housing intermediate the compressor section and the runner;

the burner including a first annular combustion chamber substantially centered on the longitudinal shaft axis and a multiplicity of secondary combustion chamber, the secondary combustion chambers being circumferentially spaced apart and positioned radially intermediate of the annular combustion chamber and the longitudinal shaft axis, each of the secondary combustion chambers having a central axis generally parallel to the longitudinal shaft axis;

the first combustion chamber being associated with a fuel inlet port for receiving the fuel and an air inlet port, the air inlet port communicating with the compressor section for receipt of compressed air flows and being structured to introduce the received compressed air flows into the annular combustion chamber in a direction such that a vortex is produced in the annular combustion chamber which circulates fuel particulates around the longitudinal shaft axis;

each of the secondary combustion chambers being associated with an air inlet port, an exhaust port aligned with the central axis of the combustion chamber and positioned towards one axial end of the secondary combustion chamber for discharge of combustion gas flows towards the runner, and an ash removal port positioned towards an axially opposing end of the secondary combustion chamber for removal of ash; and, means defining a multiplicity of flow paths, each flow path being associated with an inlet accessing the interior of the annular combustion chamber and with an outlet accessing the interior of an associated one of the secondary combustion chambers, each flow path being structured to introduce combustion gas flows from the annular combustion chamber into the associated secondary combustion chamber in a direction such that a vortex is produced in the secondary combustion chamber which circulates fuel particulates around the associated central axis and which entrains ash to the associated ash removal port, the inlet associated with each of the flow paths being positioned radially inwardly of the annular combustion zone such that the vortex associated with the first combustion chamber tends to retain larger fuel particulates until reduced sufficiently by combustion to be entrained with combustion gas flows through the passages into the secondary combustion chambers.

16. A gas turbine as claimed in claim 15 in which the air inlet port associated with each secondary combustion chamber receives compressed air flows from the compressor section and is structured to introduce the received compressed air flows into the secondary combustion chamber in a direction which enhances the vortex in the secondary combustion chamber.

17. A gas turbine as claimed in claim 16 in which each of the secondary combustion chambers comprises a cylindrical inner wall substantially centered about the associated central axis, the ash outlet port associated with each of the secondary combustion chamber opens into the associated cylindrical inner wall such that ash escapes radially outwardly from each of the secondary combustion chamber into the associated ash outlet port.

18. A gas turbine as claimed in claim 17 comprising:
an ash removal manifold communicating with the ash outlet ports of the secondary combustion chambers for receipt of ash; and, means defining a conduit extending from the ash removal manifold to a conduit outlet external to the turbine housing and conveying ash away from the manifold; and, valve means associated with conduit for restricting introduction of air through the conduit outlet into the interior of the conduit and for regulating removal of ash from the conduit outlet.

19. A gas turbine as claimed in claim 16 in which each of the secondary combustion chambers comprises and exhaust tube defining the exhaust outlet associated with the secondary combustion chamber, the exhaust tube being attached to an end wall of the associated secondary combustion chamber and extending a preselected distance into the interior of the secondary combustion chamber, the outlet associated with each flow path being positioned to introduce combustion gas flows from the first combustion chamber proximate to the combustion chamber end wall and exhaust tube of the associated secondary combustion chamber.

20. A gas turbine as claimed in claim 15 comprising solid fuel delivery means for delivering solid fuel to the interior of the first combustion chamber.

21. A gas turbine as claimed in claim 15 in which the first combustion chamber is associated with a pilot burner port for introducing a pilot burner combustion flow into the interior of the first combustion chamber.

22. Combustion apparatus as claimed in claim 3 comprises an exhaust tube defining the exhaust outlet port associated with the second combustion chamber, the exhaust tube being attached to an end wall of the second combustion chamber and extending a preselected distance into the interior of the second combustion chamber.

23. Combustion apparatus for producing combustion gas flows from a fuel and separating ash from the combustion gases, comprising:
a first combustion chamber having a first central axis and an annular combustion zone located about the first central axis;

a second combustion chamber positioned radially inwardly of the annular combustion zone and having a second central axis;

the first combustion chamber being associated with a fuel inlet port for receiving the fuel and an air inlet port, the air inlet port being structured to introduce compressed air flows into the annular combustion zone in a direction such that a vortex is produced in the annular combustion zone which circulates fuel particulates around the first central axis;

the second combustion chamber being associated with an air inlet port, an exhaust port aligned with the second central axis and positioned towards one axial end of the second combustion chamber for discharge of combustion gas flows, and an ash removal port positioned towards one axial end of the second combustion chamber for removal of ash; and, means defining a passage having an inlet accessing the annular combustion zone and an outlet accessing the interior of the second combustion chamber, the passage being structured to introduce combustion gas flows from the first combustion chamber into the second combustion chamber in a direction such that a vortex is produced in the secondary combustion chamber which circulates fuel particulates around the second central axis and which entrains ash and particulates to the associated ash removal port, the passage inlet end being positioned radially inwardly of the annular combustion zone such that the vortex associated with the first combustion chamber tends to retain larger fuel particulates until reduced sufficiently by combustion to be entrained with combustion gas flows through the passage into the second combustion chamber.

24. Combustion apparatus as claimed in claim 23 in which the air inlet port associated with the second combustion chamber is structured to introduce compressed air flows into the second combustion chamber in a direction which enhances the vortex in the second combustion chamber.

25. Combustion apparatus as claimed in claim 23 in which the second combustion chamber comprises a cylindrical inner wall substantially centered about the second central axis, the ash outlet port opening into the cylindrical inner wall such that ash escapes radially outwardly from the second combustion chamber into the ash outlet port.

26. Combustion apparatus as claimed in claim 23 comprises an exhaust tube defining the exhaust outlet port associated with the second combustion chamber, the exhaust tube being attached to an end wall of the second combustion chamber and extending a preselected distance into the interior of the second combustion chamber.

27. Combustion apparatus as claimed in claim 23 comprising solid fuel delivery means for delivering solid fuel to the interior of the first combustion chamber.

28. Combustion apparatus as claimed in claim 23 in which the first combustion chamber is associated with a pilot burner port for introducing a pilot burner combustion flow into the interior of the first combustion chamber.

29. Combustion apparatus as claimed in claim 23 in which the first and second axes are generally parallel.

* * * * *